US005705120A

United States Patent [19]

Ueno et al.

[11] Patent Number: 5,705,120
[45] Date of Patent: Jan. 6, 1998

[54] METHOD OF PRODUCING GRAPHITE FIBER-REINFORCED FLUORORESIN COMPOSITES

[75] Inventors: Takuya Ueno; Masayuki Inamori, both of Osaka, Japan

[73] Assignee: Osaka Gas Company, Limited, Osaka, Japan

[21] Appl. No.: 580,488

[22] Filed: Dec. 29, 1995

Related U.S. Application Data

[63] Continuation of Ser. No. 194,282, Feb. 8, 1994, abandoned.
[51] Int. Cl.$^6$ ............... C08L 27/12; C08K 7/06
[52] U.S. Cl. ............... 264/483; 264/29.2; 264/122; 264/127; 264/235; 264/349
[58] Field of Search .................. 264/127, 234, 264/29.1, 29.5, 29.7, 488, 29.2, 109, 122, 235, 349

[56] References Cited

U.S. PATENT DOCUMENTS

| | | |
|---|---|---|
| 3,814,642 | 6/1974 | Araki et al. |
| 4,209,480 | 6/1980 | Homsy ............... 264/127 |
| 4,333,977 | 6/1982 | Abrahams et al. ............... 264/127 |
| 4,342,679 | 8/1982 | Abrahams et al. ............... 264/127 |
| 4,422,992 | 12/1983 | Michel ............... 264/127 |
| 5,401,574 | 3/1995 | Masutani et al. |

FOREIGN PATENT DOCUMENTS

| | | |
|---|---|---|
| A4-258640 | 9/1992 | Japan. |
| 5-32842 | 2/1993 | Japan. |

*Primary Examiner*—Mathieu O. Vargot
*Attorney, Agent, or Firm*—Cushman Darby & Cushman IP Group of Pillsbury Madison & Sutro, LLP

[57] ABSTRACT

The graphite fiber-reinforced fluororesin composite including 99 to 40 parts by weight of a fluororesin, e.g. polytetrafluoroethylene, and 1 to 60 parts by weight of a graphite fiber. The graphite fiber has a specific surface area of 0.6 to 25 $m^2$/g and, as determined by X-ray photoelectron spectroscopic analysis, (1) a surface atomic oxygen/atomic carbon ratio of 0.10 to 0.20, (2) a surface atomic halogen/atomic carbon ratio of 0.05 to 1.8 or (3) a surface atomic oxygen/atomic carbon ratio of 0.10 to 0.20 and a surface atomic halogen/atomic carbon ratio of 0.05 to 1.8. Such fiber may, for example, be obtained by subjecting a graphite fiber to oxidizing treatment, halogenating treatment, or oxidizing and halogenating treatments. The graphite fiber imparts high mechanical strength characteristics and wear resistance to the composite.

15 Claims, No Drawings

METHOD OF PRODUCING GRAPHITE FIBER-REINFORCED FLUORORESIN COMPOSITES

This is a continuation of application Ser. No. 08/194,282, filed on Feb. 8, 1994, now abandoned.

FIELD OF THE INVENTION

The present invention relates to a method of producing graphite fiber-reinforced fluororesin composite having high mechanical strength and sliding characteristics and particularly with excellent wear resistance.

BACKGROUND OF THE INVENTION

Polytetrafluoroethylene is not only resistant to heat and chemicals but also has a satisfactory slidability characteristic, in particular, low coefficient of friction. However, polytetrafluoroethylene is generally unsatisfactory in wear resistance and shows a large deformation (creep) under load, particularly at high temperature. Therefore, its utility is seriously restricted in high-temperature, high load applications.

To overcome these drawbacks, various fillers such as glass fiber, glass powder or beads, carbon fiber, graphite, molybdenum disulfide, metallic lubricants, metal oxides, etc. are commonly added to polytetrafluoroethylene. Compared with the matrix resins, composites supplemented with such additives have improved wear resistance. Therefore, these resin compositions find application in a broad range of industrial uses such as sliding members, parts and elements, e.g. bearings, gears, bushes, packings, various other sealing members, piston rings, ball valve seats, sliding bands and so on.

However, when said composite is used under high load at high temperature, it is insufficient in the mechanical strength, compressive creep characteristics and wear resistance of the composites including wear resistance of counterpart member. This holds true even when shaped articles are obtained by adding a carbon fiber as a filler. This is caused probably inadequate wettability between polytetrafluoroethylene and the carbon fiber.

SUMMARY OF THE INVENTION

It is an object of the present invention, therefore, to provide a method of producing a graphite fiber-reinforced fluororesin composite having high mechanical strength and excellent integrity, compressive strength characteristics and wear resistance.

It is another object of the present invention to provide a method of producing a graphite fiber-rein-forced fluororesin composite having high mechanical characteristics and wear resistance even under high load.

A further object of the present invention is to provide a method of producing a graphite fiber-reinforced fluororesin composite useful for sliding parts.

The inventors of the present invention found, after much research done to improve the mechanical strength and sliding characteristics and, in particular, wear resistance of graphite fiber-reinforced fluororesin composites that the selective use of a graphite fiber having a herein-defined surface condition results in marked improvements in the compressive strength and wear resistance characteristics of graphite fiber-reinforced fluororesin composites. The present invention has been completed on the basis of the above finding.

The present invention provides a graphite fiber-reinforced fluororesin composite comprising a fluororesin and a graphite fiber with a specific surface area of 0.6 to 25 $m^2/g$ and, as determined by X-ray photoelectron spectroscopic analysis, (1) a surface atomic oxygen/atomic carbon ratio of 0.10 to 0.20, (2) a surface atomic halogen/atomic carbon ratio of 0.05 to 1.8 or (3) a surface atomic oxygen/atomic carbon ratio of 0.10 to 0.20 and a surface atomic halogen/atomic carbon ratio of 0.05 to 1.8.

The present invention further provides a method of manufacturing graphite fiber-reinforced fluororesin composites which comprises molding, into a shaped article, a composition comprising a fluororesin and a graphite fiber with a specific surface area of 0.6 to 25 $m^2/g$ and, as determined by X-ray photoelectron spectroscopic analysis, (1) a surface atomic oxygen/atomic carbon ratio of 0.10 to 0.20, (2) a surface atomic halogen/atomic carbon ratio of 0.05 to 1.8 or (3) a surface atomic oxygen/atomic carbon ratio of 0.10 to 0.20 and a surface atomic halogen/atomic carbon ratio of 0.05 to 1.8. A graphite fiber-reinforced fluororesin composite may be produced, for example, by compression-molding said composition into an article and annealing the resultant article, or by subjecting said composition to extrusion or injection molding.

DETAILED DESCRIPTION OF THE INVENTION

The fluororesin which can be used in this invention includes various fluorine-contained polymers. The fluororesin includes, but is not limited to, homopolymers or copolymers of fluorine-containing monomers such as tetrafluoroethylene, chlorotrifluoroethylene, vinyl fluoride, vinylidene fluoride, hexafluoropropylene, perfluoroalkyl vinyl ether, etc. and copolymers of said fluorine-containing monomers with other monomers copolymerizable therewith, such as ethylene, propylene, various acrylic esters and so on. As typical examples of fluororesin, there may be mentioned such homopolymers as polytetrafluoroethylene, polychlorotrifluoroethylene, polyvinylidene fluoride, etc. and such copolymers as tetrafluoroethylene-hexafluoropropylene copolymer, tetrafluoroethylene-perfluoroalkyl vinyl ether copolymer, tetrafluoroethylene-hexafluoropropylene-perfluoroalkyl vinyl ether copolymer, ethylene-tetrafluoroethylene copolymer, ethylene-chlorotrifluoroethylene copolymer and so on. Particularly preferred fluororesin includes polytetrafluoroethylene. These fluororesins can be used alone or in combination.

The graphite fiber which can be used in the present invention includes, for example, graphite fibers derived from coal pitch, petroleum pitch, liquid crystal pitch, polyacrylonitrile, phenolic resin, rayon, cellulose and other materials. Such graphite fibers may be used alone or in combination.

The term "graphite fiber" as used herein means the fiber obtained by heat-treating a carbon fiber or a precursor fiber, which has been subjected to surface infusiblization (flame resistance) treatment and is capable of being carbonized or graphitized, at a temperature not below 1,600° C., preferably at 1,600° to 3,300° C. and more preferably 2,200° to 3,000° C. The fiber heat-treated within the above-mentioned temperature range differs from the carbon fiber in oxidation resistance or thermal stability.

The graphite fiber to be used in this invention should have a specific surface area of 0.6 to 25 $m^2/g$, preferably 0.6 to 10 $m^2/g$, more preferably 0.8 to 8 $m^2/g$ and, for still better results, 1 to 6 $m^2/g$. The graphite fiber having such a specific surface area shows excellent wettability with respect to fluororesins, with the result that it contributes not only to the mechanical strength of the fluororesin-graphite fiber composite article but also to the wear resistance of the composite article and that of the counterpart member which is associated with said composite article in use. The graphite fiber having such a specific surface area can be obtained by an oxidation treatment.

There is no particular limitation on the filament diameter and length of the graphite fiber which can be used in this invention. Generally short staples with filament diameters in the range of about 1 to 20 μm and preferably 5 to 20 μm, and filament lengths not less than 10 μm, preferably 50 μm to 5 mm, more preferably 50 μm to 3 mm and particularly 50 to 500 μm are employed.

Furthermore, the graphite fiber should have (1) a surface atomic oxygen-atomic carbon ratio ($O_{IS}/C_{IS}$) of 0.1 to 0.20, preferably 0.12 to 0.20 and more preferably 0.15 to 0.20, as determined by X-ray photoelectron spectroscopic analysis, and/or (2) a surface atomic halogen (F, Cl, Br, I)/atomic carbon ratio ($X_{IS}/C_{IS}$) of 0.05 to 1.8, preferably 0.05 to 1.5 and more preferably 0.15 to 1.5, as determined by said analysis.

Since such graphite fiber shows excellent wettablity with respect to the matrix fluororesin, it contributes further to the strength of the fluororesin-graphite fiber composite and, hence, to the wear resistance of the shaped article manufactured from such a composite and of the counterpart member.

The representative methods for producing a graphite fiber with a surface atomic oxygen-atomic carbon ratio falling within the above-defined range of this invention are described below.

1. A graphite fiber is oxidized with an oxygen-containing compound either in liquid phase or in gas phase.

2. A graphite fiber is mechanically comminuted or pulverized in an oxygen-containing gas.

3. An inorganic oxidizing agent is applied to the surface of a graphite fiber and heat-treated.

4. A graphite fiber is subjected to electrolytic oxidation in an electrolyte solution using the fiber as the positive electrode.

5. A graphite fiber is subjected to plasma discharge treatment in a nitrogen or other inert gas and, then, contacted with an oxygen-containing gas.

Graphite fibers with a surface atomic halogen/atomic carbon ratio within the range of this invention can, for example, be produced by the following methods.

6. A graphite fiber is subjected to chemical reaction with a halogen or a halogen-containing inorganic compound.

7. A graphite fiber is subjected to plasma discharge treatment in a halogen-containing gas.

8. A halogen-containing monomer is polymerized on the surface of a graphite fiber.

9. A graphite fiber is sized With a halogen-containing compound.

10. A halogen-containing compound having a reactive terminal group is grafted to a graphite fiber.

In the above methods 7 to 10, a fluorine-containing component is suitably used as a halogen-containing component. The above methods can be applied alone or in a suitable combination. In the preferred embodiments, the procedure of the methods 6 to 10 is conducted in combination with the oxidation treatment in the above methods 1 to 5. It is particularly recommendable to prepare a graphite fiber with a predetermined surface concentration of oxygen by any of the above methods 1, 2, 3, 4 and 5 and, then, size the fiber with a halogen-containing compound or graft a halogen-containing compound having a reactive terminal group to the fiber.

The above-mentioned respective methods are now described in further detail.

1. Oxidation of a graphite fiber with an oxygen-containing compound in gas or liquid phase, This method can be carried out in accordance with the conventional manner in the presence of an oxygen-containing gas or using an oxygen-containing liquid. Thus, a chemical oxidation process includes, for example, the gas-phase oxidation process comprising contacting a graphite fiber with one or more oxygen-containing gases such as oxygen, ozone, water vapor or steam, carbon monoxide, carbon dioxide, nitrogen dioxide, etc. and the liquid phase oxidation process comprising contacting a graphite fiber with a solution containing one or more oxidizing compounds such as concentrated nitric acid, sulfuric acid, chromic acid, dichromic acid, permanganic acid, a perhalogenic acid, a hypohalogenous acid, hydrogen peroxide, etc.

In order to reduce the treating time, the gas-phase oxidation is preferably carried out at a temperature of about 500° to 1,000° C. and the liquid-phase oxidation at about 60° to 120° C. The treating time is not particularly limited and is selected, depending on a treating temperature and the like, within the range not adversely affecting on the strength of a graphite fiber and oxygen atom being introduced onto said surface atomic oxygen/atomic carbon ratio, 2. Mechanical size reduction of a graphite fiber in an oxygen-containing atmosphere This method can be carried out by the conventional technology for pulverizing carbon fibers. For example, graphite fiber tows or chops in the size range of 1 mm to 150 mm are comminuted to 10 to 700 μm in length in the presence of an oxidizing agent using a mixer, pulverizer or the like. The oxidizing agent includes, for example, air, an oxidizing compound described in the above method 1. Air is preferable as said oxidizing agent.

3. Application of an inorganic oxidizing agent to the surface of a graphite fiber and subsequent heat treatment This method can be carried out in accordance with the known manner, e.g. by sizing a graphite fiber with a sizing composition containing an inorganic oxidizing agent or by depositing fine particles of an inorganic oxidizing agent on the surface of a graphite fiber. Thus, the oxidizing agents are dispersed on the surface of a graphite fiber and the treated fiber is subjected to a heat treatment at a temperature of about 300° to 1,000° C. The treating time is not particularly limited and is selected, depending on a treating temperature and the like, within the range not adversely affecting on the strength of a graphite fiber and oxygen atom being introduced onto said surface atomic oxygen/atomic carbon ratio.

Examples of the oxidizing agent include an oxoacid containing a transition metal such as potassium permanganate, potassium dichromate, sodium permanganate, sodium dichromate, etc. As the oxidizing agent, an alkali metal hydroxide such as sodium hydroxide, potassium hydroxide, etc. may be used. These oxidizing agents may be used alone or in combination.

4. Electrolytic oxidation of a graphite fiber, as the positive electrode, in an electrolyte solution Using a graphite fiber as the positive electrode and a metal as the negative electrode, an electricity of not less than 100 coulombs/g (graphite fiber), preferably 300 to 5,000 coulombs/g (graphite fiber) and more preferably 500 to 2,000 coulombs/g (graphite fiber) is passed through an electrolyte solution capable of electrolytic oxidation such as an aqueous solution of an acid, e.g. nitric acid, sulfuric acid, hypochlorous acid, etc., a base, e.g. sodium hydroxide, potassium hydroxide, etc. or a salt, e.g. sodium chloride, ammonium sulfate, calcium carbonate, etc. The bath temperature is not critical but is preferably in the range of 20° to 100° C. and more preferably 20° to 50° C. The time of electrolytic oxidation is not particularly limited and is selected within the range not adversely affecting on the strength of a graphite fiber.

5. Plasma discharge treatment of a graphite fiber in a fluorine-free gas (e.g. an inert gas) and subsequent exposure of the fiber to an oxygen-containing gas This method can also be carried out according to the conventional manner. Thus, a graphite fiber is placed in an external electrode-type low-temperature plasma apparatus having a pair of external discharge electrodes one of which is grounded and treated with a low-temperature plasma created by glow discharge in streams of a fluorine-free gas under reduced pressure. As an alternative, a graphite fiber is placed in an internal electrode-type low-temperature plasma apparatus having a pair of internal discharge electrodes one of which is grounded and treated with a low-temperature plasma created by glow discharge in streams of a fluorine-free gas under reduced pressure.

The graphite fiber which can be used in this plasma treatment may be of any form, e.g. milled fiber, chop, mat, felt, filament, a woven fabric such as cloth, etc.

The atmospheric gas for this plasma treatment includes an inert gas such as He, Ne, At, $N_2$ and so on. These gases may be used in combination.

The pressure within the reaction vessel is about 0.001 to 10 Torr, preferably about 0.01 to 5 Torr and more preferably about 0.01 to 2 Torr. By applying an electric power of 10W to 100 kW at a high frequency of 10 kHz to 100 MHz under the above gas pressure, a steady glow discharge can be obtained. The plasma treatment time is, for example, 10 min. to 10 hours and preferably 10 min. to 2 hours. As to the discharge frequency band, a low frequency wave, microwave, direct current, etc. can be used in lieu of the above-mentioned high frequency wave.

The electrode configuration is not critical and the pair of electrodes may be identical or dissimilar in shape. For example, they may be ring-shaped, plate-shaped or rod-shaped.

As an oxygen-containing gas, the same oxygen-containing gas in the above method 1 may be used.

6. Chemical reaction of a graphite fiber with a halogen or a halogen-containing inorganic compound This treatment can be carried out by the conventional technology for reacting a halogen or a halogen-containing inorganic compound with a graphite fiber in liquid phase, gas phase or bulk.

For example, the method comprising suspending a graphite fiber in a halogen-containing solvent (e.g. carbon tetrachloride, dichloroethane) and reacting it with a halogen such as bromine or chlorine under heating, the method comprising reacting a graphite fiber with a halogen such as bromine or other halogen gas in gas phase, and the method comprising reacting a graphite fiber with a halogen-containing inorganic compound (halogenating inorganic compound) such as phosphorus pentachloride or the like in bulk under heating can be mentioned. The reaction of graphite fiber and a halogen or a halogen-containing inorganic compound may be carried out in the presence of a Lewis acid catalyst such as ferric chloride and the like.

The graphite fiber to be reacted with a halogen or a halogen-containing inorganic compound may have been surface-oxidized.

7. Plasma discharge treatment of a graphite fiber in a halogen-containing gas

This method can also be carried out in the per se known manner. Thus, a graphite fiber is placed in an external electrode-type low-temperature plasma apparatus having a pair of external discharge electrodes one of which is grounded and treated with a low-temperature plasma created by glow discharge in streams of a halogen-containing gas under reduced pressure. As an alternative, a graphite fiber is placed in an internal electrode-type low-temperature plasma apparatus having a pair of internal discharge electrodes one of which is grounded and treated with a low-temperature plasma created by glow discharge in streams of a halogen-containing gas under reduced pressure.

The graphite fiber which can be used in this plasma treatment may be of any form, e.g. milled fiber, chop, mat, felt, filament, a woven fabric such as cloth, etc.

The halogen-containing gas includes a chlorine- or bromine-containing gas such as fluorine, bromine, dichloromethane, trichloromethane, and so on, but preferably a fluorine-containing gas. As typical examples of the fluorine-containing gas, there may be mentioned $C_3F_6$, $C_2F_4$, $CF_4$, $C_3F_8$, $C_2F_6$, $CH_3F$, $CBrF_3$, $CClF_2CF_3$, etc. The preferred fluorine-containing gas may be $C_3F_6$. These gases can be used alone, in combination or in admixture with an inert gas such as He, Ne, At, etc.

The pressure within the reaction vessel is about 0.001 to 10 Torr, preferably about 0.01 to 5 Torr and more preferably about 0.01 to 2 Torr. By applying an electric power of 10W to 100 kW at a high frequency of 10 kHz to 100 MHz under the above gas pressure, a steady glow discharge can be obtained. The plasma treatment time is selected suitably in the range from 10 min. to 10 hours and preferably 10 min. to 2 hours. Referring to the discharge frequency band, a low frequency wave, microwave, direct current, etc. can be used instead of the above-mentioned high frequency wave.

The electrode configuration is not critical and the pair of electrodes may be identical or dissimilar in shape. Moreover, they may be ring-shaped, plate-shaped or rod-shaped, for instance.

8. Polymerization of a halogen-containing monomer on the surface of a graphite fiber A halogen-containing monomer is polymerized on the surface of a graphite fiber in liquid phase or gas phase in the per se known manner.

The halogen-containing monomer having an polymerizable ethylenically unsaturated bond may be a chlorine- or bromine-containing monomer such as vinyl chloride, vinylidene chloride, and includes preferably a fluorine-containing monomer. The fluorine-containing monomer that can be used includes various monomers such as tetrafluoroethylene, chlorotrifluoroethylene, vinyl fluoride, vinylidene fluoride, hexafluoropropylene, perfluoroalkyl vinyl ether, etc. Such fluorine-containing monomer may be used with a copolymerizable monomer such as ethylene, propylene, acrylic esters and the like. The fluorine-containing monomers can be used alone or in combination.

The fluorine-containing polymer or resin which can thus be formed on the surface of a graphite fiber includes, for example, polytetrafluoroethylene, polychlorotrifluoroethylene, polyvinylidene fluoride, tetrafluoroethylene-hexafluoropropylene copolymer, tetrafluoroethylene-perfluoroalkyl vinyl ether copolymer, tetrafluoroethylene-hexafluoropropylene-perfluoroalkyl vinyl ether copolymer, tetrafluoroethylene-ethylene copolymer, ethylene-chlorotrifluoroethylene-ethylene copolymer and so on. Among these fluororesins, polytetrafluoroethylene is useful.

The catalyst for polymerizing said halogen-containing monomer includes those compounds which are commonly used for the like purpose. As the catalyst or polymerization initiator, there may be, for example, peroxides such as t-butyl perbenzoate, di-t-butyl peroxide, t-butyl hydroperoxide and dilauroyl peroxide, azobisisobutyronitrile, a persulfate such as ammonium persulfate, potassium persulfate, sodium persulfate and the like. The preferred catalyst includes peroxides such as t-butyl perbenzoate.

The solvent which can be used for the liquid-phase reaction includes the various solvents which are commonly employed, including Fleon 113 (trichlorotrifluoroethane) and water. The preferred solvent includes Fleon 113.

The relative amount of the graphite fiber to the halogen-containing monomer in terms of the corresponding polymer is, for example, 99.9 to 50 parts by weight relative to 0.1 to 50 parts by weight of said monomer, preferably 99 to 80 parts by weight relative to 1 to 20 parts by weight of the monomer, and more preferably 99 to 90 parts by weight relative to 1 to 10 parts by weight of the monomer.

The polymerization can be conducted, for instance, at a temperature of 40° to 120° C. and preferably 60 to 100° C. in an inert gas such as He, Ar, $N_2$ and the like.

9. Sizing a graphite fiber with a halogen-containing compound

A graphite fiber or a graphite fiber having a predetermined surface oxygen content is dipped in a solution, emulsion or suspension containing a halogen-containing compound and the solvent is then removed. The halogen-containing compound may be, for example, a chlorine- or bromine-containing compound, and includes preferably a fluorine-containing compound.

The solution of a halogen-containing compound may be prepared by dissolving such compound in a good solvent such as a halogenated carbon, e.g. a fluorocarbon for a fluorine-containing compound. The emulsion or suspension may be prepared by dispersing a solid halogen-containing compound in the size range of 0.1 to 100 μm uniformly in a solvent which does not dissolve the compound, e.g. water, aliphatic hydrocarbons such as hexane and octane, alicyclic hydrocarbons such as cyclohexane, aromatic hydrocarbons such as toluene, halogenated hydrocarbons such as Fleon 113, etc., by dissolving a halogen-containing compound in a good solvent such as a halogenated carbon (e.g. a fluorocarbon) and then dispersing the solution uniformly in a poor solvent which does not dissolve the halogen-containing compound, e.g. water, or by a emulsion polymerization of a halogen-containing unsaturated monomer in an aqueous medium.

The relative amount of the halogen-containing compound and graphite fiber is generally 1 to 15 parts by weight of the halogen-containing compound relative to 99 to 85 parts by weight of the graphite fiber and preferably 5 to 10 parts by weight of the halogen-containing compound relative to 95 to 90 parts by weight of the graphite fiber. This composition provides for good wettability between the graphite fiber and the matrix fluororesin.

The halogen-containing compound, particularly fluorine-containing compound preferably has a softening point not below 200° C. or, for still better results, not below 250° C. The fluorine-containing compound includes, for example, fluorine-contained polymers such as polytetrafluoroethylene, polychlorotrifluoroethylener polyvinylidene fluoride, tetrafluoroethylene-hexafluoropropylene copolymer, tetrafluoroethylene-perfluoroalkyl vinyl ether copolymer, tetrafluoroethylene-hexafluoropropylene-perfluoroalkyl vinyl ether copolymer, tetrafluoroethylene-ethylene copolymer, ethylene-chlorotrifluoroethylene-ethylene copolymer, etc. and fluorinated pitches. The fluorinated pitches are soluble in a fluorocarbon. Among these fluorine-containing compounds, polytetrafluoroethylene and fluorinated pitches are preferable. These fluorine-containing compound may be used alone or in combination. Moreover, within the range not adversely affecting the composite, the graphite fiber may be sized with a mixture of a fluorine-free organic compound with said fluorine-containing compound.

When the graphite fiber with a predetermined concentration of oxygen on its surface as prepared by any of the methods 1, 2, 3, 4 and 5 described above is sized with said halogen-containing compound, particularly fluorine-containing compound, a further improvement in wettability can be insured between the graphite fiber and the matrix fluororesin.

For the purpose of insuring the stability of the above-mentioned emulsion or suspension of the fluorine-containing compound, a fluorine-containing surfactant (cationic, anionic or nonionic) may be added. Moreover, if in small amounts, ordinary surfactants having alkyl groups, aryl groups, alkylaryl groups or alkyleneoxy groups in the backbone chain may also be employed.

10. Grafting of an halogen-containing compound having reactive terminal group to a graphite fiber Halogen-containing compounds having reactive terminal groups can be grafted to the graphite fiber. The halogen-containing compound is advantageously grafted to the graphite fiber which has been surface-treated to impart a predetermined oxygen content by any of the methods 1, 2, 3, 4 and 5, for instance.

The halogen-containing compounds may be, for example, a chlorine- or bromine-containing compound, but the preferred is a fluorine-containing compound. The fluorine-containing compound having reactive terminal groups includes, for example, compounds having terminal reactive groups such as epoxy, acyl halide, carboxyl, etc., and a backbone chain represented by the following composition formula:

(CnFm)

wherein n is an integer of 2 to 15, or

(CnFxHyOz)

wherein n is an integer of 2 to 30; y is an integer of 0 to 10; z is an integer of 0 to 5; and x+y=2n+1, 2n−1 or 2n−5; provided that y and z are not zero at the same time.

Thus, the fluorine-containing compound having a reactive terminal group may be represented by Rf-X: wherein Rf denotes (CnFm) or (CnFxHyOz) as mentioned above, and X represents a reactive terminal group.

The backbone chain of the fluorine-containing compound may have an alkylene, an alkenylene, a cycloalkylene or phenylene chain which may have fluorine atom. The backbone chain may further have an branched alkoxy group optionally substituted with fluorine.

The preferred compounds may be represented by the following formula (I) or (II):

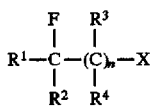
(I)

wherein $R^1$, $R^2$, $R^3$ and $R^4$ are independently H, F or $CF_3$; n is an integer of 0 to 30; $R^3$ and $R^4$ may be different from one another in the repetition of n; and X represents COCl, COBr, COF,

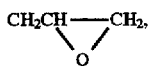

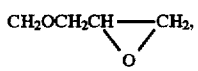

or COOH.

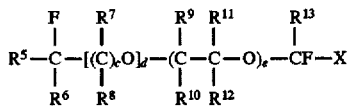
(II)

wherein $R^5$ to $R^{13}$ are independently H, F or $CF_3$; c is an integer of 1 to 3; d is an integer of 0 to 15; e is an integer of 0 to 15; $R^7$ and $R^8$ may be different from one another in the repetition of c or d; $R^9$, $R^{10}$, $R^{11}$ and $R^{12}$ may be different from one another in the repetition of e; d+e=1–30; and X represents COCl, COBr, COF,

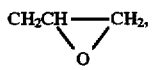

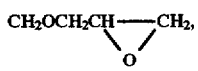

or COOH.

In the preferred compounds represented by the formula (I), $R^1$ and $R^2$ are independently H, F or $CF_3$ (particularly F or $CF_3$); $R^3$ and $R^4$ are F; and n is an integer of 1 to 20. In the preferred compounds shown by the formula (II), $R^5$ to $R^8$ are F; $R^9$ is F or $CF_3$; $R^{10}$, $R^{11}$ and $R^{12}$ are F; $R^{13}$ is F or $CF_3$; d is an integer of 1 to 5; e is an integer of 1 to 5; and d+e=1–15.

As examples of the fluorine-containing compound, there may be mentioned $CF_3CH_2COOH$, $F(CF_2)_nCOOH$ (n=3–10), $CHF_2CF_2COOH$, perfluoro (2,5,8-trimethyl-3,6,9-trioxadodecanoyl)fluoride [F $(CF_2)_3O(CF$ $(CF_3)$ $CF_2O)_2CF$ $(CF_3)$ COF], perfluoro(2,5,8,11-tetramethyl-3,6,9,12-tetraoxapentadecanoyl)fluoride [F($CF_2)_3O(CF$ $(CF_3)$ $CF_2O)_3CF(CF_3)COF$], $H(CF_2)_4COCl$, $H(CF_2)_6COCl$, $H(CF_2)_8COCl$, H $(CF_2)_{10}COCl$, $H(CF_2)_8$ COBr,

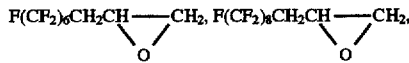

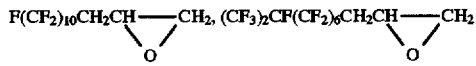

and $H(CF_2)_4CH_2OCH_2CH$——$CH_2$.

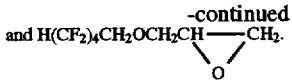

The preferred species includes, for example, a compound having acyl halide group(s) such as $H(CF_2)_4COCl$, $H(CF_2)_6COCl$, $H(CF_2)_8COCl$, $H(CF_2)_{10}COCl$, $H(CF_2)_8COBr$.

The reaction between the graphite fiber having a predetermined surface oxygen content and the halogen-containing compound (particularly the fluorine-containing compound) having a reactive terminal group can be directly carried out in liquid phase under heating or by the process comprising introducing active groups, which can be reacted with the reactive terminal group of the halogen-containing compound, onto the surface of graphite fiber and conducting the reaction in liquid phase under heating.

The amount of the graphite fiber relative to the halogen-containing compound is, for example, 99.9 parts by weight of the graphite fiber to 0.1–10 parts by weight of the compound, preferably 99.5 to 95 parts by weight of the fiber to 0.5–5 parts by weight of the compound and more preferably 99.5 to 97 parts by Weight of the fiber relative to 0.5–3 parts by weight of the compound.

The solvent which is used in the first-mentioned direct reaction process can be any solvent that is capable of dissolving but inert to the halogen-containing compound having a reactive terminal group. As the solvent, there may be, for example, ketones such as methyl ethyl ketone (MEK) and acetone, ethers such as tetrahydrofuran (THF), diethyl ether and so on. The reaction temperature is any temperature below the boiling point of the solvent, provided that the reaction is allowed to quantitatively proceed.

The solvent for use in the latter process comprising introducing active groups onto the surface of graphite fiber and conducting the reaction under heating can also be any solvent that is capable of dissolving and inert to the halogen-containing compound having a reactive terminal group. As such solvent, ketones such as MEK and acetone, ethers such as THF and diethyl ether, etc. can be employed. The reaction temperature is not critical, either, only if it is below the boiling point of the solvent and allows the reaction to proceed quantitatively.

The introduction of active groups onto the surface of a graphite fiber can be carried out in accordance with the conventional manner, for example the lithiation process using a lithiating agent such as n-butyllithium, t-butyllithium or the like, the process using a reducing agent, which converts carboxyl groups to hydroxyl groups, such as $LiAlH_4$, or the like to introduce OH groups, and the process using a halogenating agent such as bromine, chlorine, phosphorus pentachloride or the like to introduce halogen groups other than fluorine.

The above-mentioned lithiation process comprises reacting a graphite fiber with the lithiating agent such as n-butyllithium, t-butyllithium or the like in a solvent such as THF, diethyl ether or the like under heating. The process for introducing OH groups comprising reacting a graphite fiber with the reducing agent such as $LiAlH_4$ or the like in a solvent such as THF, diethyl ether or the like under heating.

The technology for introducing halogens other than fluorine includes, for example, the process which comprises reacting the graphite fiber with bromine, chlorine or the like in a halogen-containing solvent under heating, the process comprising reacting the graphite fiber with, for example, bromine in gas phase and the process comprising reacting the graphite fiber with, for example, phosphorus pentachloride in bulk under heating.

The treatment in the above methods 1 to 10 for modifying the surface characteristics of the graphite fiber is conducted within the range not adversely affecting on the fiber strength. Each treatment procedure may be repeated, if necessary.

The relative amount of fluororesin and graphite fiber for use in this invention can be selected according to the intended use of end products but is generally 99 to 40 parts by weight of the fluororesin relative to 1–60 parts by weight of the graphite fiber, preferably 95 to 65 parts by weight of the fluororesin relative to 5–35 parts by weight of the graphite fiber and more preferably 92 to 75 parts by weight of the fluororesin relative to 8–25 parts by weight of the graphite fiber. When a fluororesin composite material having such composition is molded, there is obtained a fluororesin-graphite fiber composite product having high mechanical strength, integrity, compressive creep characteristic and wear resistance.

Within the range not adversely affecting its characteristics, the fluororesin composite material of this invention may contain a variety of additives such as fibrous reinforcing materials (for instance, short and long staples, e.g. other carbon fiber, glass fiber, aramid fiber, boron fiber, aluminum fiber, silicone carbide fiber, etc., whiskers, fibrous materials obtainable by cladding them with a metal such as nickel, aluminum, copper or the like), reinforcing fillers such as carbon blank, molybdenum disulfide, mica, talc, calcium carbonate, etc., metallic lubricants such as Sn, Pb, Cu, Zn and Li or their alloys, metal oxides such as the oxides of Sn, Zn, Al, Sb, Co, Si, Cu, Pb, etc., compound oxides of metals such as $Co-Al_2O_3$, coloring materials, stabilizers and so on.

In the present invention, the conventional molding processes may be used for molding the composition comprising said fluororesin and said graphite fiber into a shaped article. A typical molding method that can be employed comprises mixing a powder of said fluororesin with the graphite fiber evenly using a mixer such as a Henschel mixer or the like, compression-molding the resulting mixture in a metal die or mold and heat-treating the molding at a temperature not below the melting point of the fluororesin (the last procedure is called annealing). An alternative method is melt extrusion or injection molding using the above mixture. In the former method involving prior shaping, it is important to insure that the fluororesin powder and graphite fiber be evenly admixed. The extrusion or injection molding can be conducted under a meltable temperature of the fluororesin in the mixture.

The following examples are only illustrative of this invention and should by no means be construed as defining the scope of the invention.

EXAMPLES

Example 1

A graphite fiber (SG241, manufactured by DONAC Co., Ltd.; Japan, mean filament diameter 13 μmφ, mean filament length 130 μm) was oxidized in concentrated nitric acid (d=1.40) at 100° to 120° C. for 3 hours and rinsed thoroughly with distilled water. The relative amount of graphite fiber and concentrated nitric acid was 13 parts by weight relative to 87 parts by weight. Ten (10) parts by weight of the thus-treated graphite fiber was mixed with 90 parts by weight of polytetrafluoroethylene (M-12, manufactured by Daikin Industries Ltd.; Japan) in a super-mixer. The resulting powdery mixture was put in a metal mold and compression-molded at a pressure of 650 kg/cm² to provide a shaped article measuring 50 mmφ×100 mm. This article was annealed in a nitrogen gas atmosphere by heating from room temperature to 390° C. at the rate of 120° C./hr, holding at 390° C. for 5 hours and, then, cooling to room temperature at the rate of 75° C./hr. The product Was subjected to the compressive strength test and the sliding test in accordance with Japanese Industrial Standards JIS K7218 (counterpart material JIS ADC-12, load 4 kg/cm², speed 1 m/sec, test time 20 hours).

Example 2

A graphite fiber (S210, DONAC Co., Ltd., mean filament diameter 13 μmφ, staples) was heat-treated in a nitrogen gas atmosphere by heating from room temperature to 2,000° C. at the rate of 4° C./min., holding at 2,000° C. for 3 hours and, then, cooling to room temperature at the rate of 4° C./min. The treated graphite fiber was pulverized in air in a mill, size-classified with a vibrating sieve to give a graphite fiber with a mean filament length of 64 μm, and molded as in Example 1. The article was subjected to the compressive strength test and sliding test.

Example 3

One (1) kilogram of a graphite fiber (SG241, DONAC Co., Ltd., mean filament diameter 13 μmφ, mean filament length 130 μm) was evenly mixed with 500 g of a 3% aqueous solution of potassium permanganate and the water was thoroughly evaporated off. The thus-sized graphite fiber was heat-treated in a nitrogen gas atmosphere by heating from room temperature to 500° C. at the rate of 4° C./min., holding at 500° C. for 1.5 hours and, then, cooling to room temperature at the rate of 4° C./min. The resultant graphite fiber was molded as in Example 1 and subjected to the compressive strength test and sliding test.

Example 4

Using a platinum oxide-coated titanium oxygen-generating electrode (90 mm×90 mm, 3 mm in thickness) as the positive electrode and a titanium electrode (90 mm×25 90 mm, 3 mm in thickness) as the negative electrode, a filter paper (positive electrode side, 90 mm×90 mm) and 50 g of a graphite fiber (SG241, DONAC Co., Ltd., mean filament diameter 13 μmφ, mean filament length 130 μm) impregnated with 35 g of 1M nitric acid were interposed between the two electrodes under a pressure of 1 kgf/cm² and an electricity of 5×10⁴ coulombs was passed at 200 mA, 1.7 V. This procedure was repeated for a total of 10 times and the resultant graphite fiber was molded as in Example 1 and subjected to the compressive strength test and sliding test.

Example 5

A rotary separable flask of 3-liter capacity was filled with 100 g of a graphite fiber (SG241, DONAC Co., Ltd., mean filament diameter 13 μmφ, mean filament length 130 μm). Then, at room temperature under a reduced pressure of 2 Torr, argon gas was passed at the rate of 0.1 liter/min. and a plasma discharge reaction was carried out with an electrode gap of 10 cm, a high frequency of 13.8 MHz and a power of 100 W for 2 hours. After plasma discharge treatment, air was introduced into the flask. The above procedure was repeated for a total of 5 times and the resultant graphite fiber was molded as in Example 1 and subjected to the compressive strength test and sliding test.

Example 6

A carbon fiber (SG241, DONAC Co., Ltd., mean filament diameter 13 μmφ, mean filament length 130 μm) was heat-treated in a nitrogen gas atmosphere by heating from room temperature to 1,500° C. at the rate of 4° C./min., holding at 1,500° C. for 3 hours and, then, cooling to room temperature at the rate of 4° C./min. A 100 g portion of the heat-treated graphite fiber was reacted with 15 g of bromine in the presence of 0.2 g of ferric chloride in 1,000 g of carbon tetrachloride under reflux at 60° C. for 3 hours. The fiber was then washed thoroughly with dehydrated ether. This procedure was repeated for a total of 5 times and the resultant graphite fiber was molded as in Example 1 and subjected to the compressive strength test and sliding test.

Example 7

A rotary separable flask of 3-liter capacity was filled with 100 g of a graphite fiber (SG241, DONAC Co., Ltd., mean filament diameter 13 μmϕ, mean filament length 130 μm). Then, at room temperature under a reduced pressure of 2 Torr, $C_3F_6$ was passed at the flow rate of 0.1 liter/min. and a plasma reaction was carried out with an electrode gap of 10 cm, a high frequency of 13.6 MHz and a power of 100 W for 2 hours. This procedure was repeated for a total of 5 times and the resultant graphite fiber was molded as in Example 1 and subjected to the compressive strength test and sliding test.

Example 8

Fifty (50) grams of a graphite fiber (SG241, DONAC Co., Ltd., mean filament diameter 13 μmϕ, mean filament length 130 μm) was dipped in a bath containing 10 mg of t-butyl perbenzoate in 30 ml of acetone and, then, thoroughly dried. A SUS-made autoclave of 100 ml capacity was charged with the above graphite fiber, 70 ml of Fleon 113 and 5.0 g, of $C_2F_4$ and the reaction was carried out at 50° C. for 3 hours. This procedure was repeated for a total of 10 times and the resultant graphite fiber was molded as in Example 1 and subjected to the compressive strength test and sliding test.

Example 9

Fifty (50) grams of a graphite fiber (SG241, DONAC Co., Ltd., mean filament diameter 13 μmϕ, mean filament length 130 μm) was dipped in an emulsion bath prepared by using 20 g of an aqueous polytetrafluoroethylene emulsion (Kitamura Co., Ltd.; Japan, KD-100AS, concentration 30 wt. %) and 50 g of distilled water and, then, thoroughly dried. This procedure was repeated for a total of 10 times and the resultant graphite fiber was molded as in Example 1 and subjected to the compressive strength test and sliding test.

Example 10

Thirty five (35) grams of a graphite fiber (SG241, DONAC Co., Ltd., mean filament diameter 13 μmϕ, mean filament length 130 μm) was oxidized in the presence of 300 g of concentrated nitric acid (d=1.40) at 100° to 120° C. for 3 hours and, then, thoroughly washed with distilled water. A separable flask of 1-liter capacity was filled with the resultant graphite fiber, 50 ml of THF and 50 mmol of $LiAlH_4$ and the reaction was conducted under reflux in a $N_2$ atmosphere for 2 hours. After decomposition of the unreacted reagent, the graphite fiber was recovered. Then, a separable flask of 1-liter capacity was filled with the above graphite fiber, 500 ml of THF and 300 mmol of n-butyllithium/hexane and the reaction was carried out under reflux in an $N_2$ stream for 1 hour. Then, 10 g of $H(CF_2)_6COCl$ was added and the reaction was conducted at room temperature for 24 hours.

After decomposition of the unreacted reagent, the graphite fiber was recovered. The above procedure was repeated for a total of 20 times and the resultant graphite fiber was molded as in Example 1 and subjected to the compressive strength test and sliding test.

Example 11

A graphite fiber (S210, DONAC Co., Ltd., mean filament diameter 13 μmϕ, Staples) was heat-treated in a nitrogen gas atmosphere by heating from room temperature to 2,000° C. at the rate of 4° C./min., holding at 2,000° C. for 3 hours and, then, cooling to room temperature at the rate of 4° C./min. The heat-treated graphite fiber was pulverized in a mill and size-classified with a vibrating sieve to provide a graphite fiber with a mean filament length of 64 μm.

A fluorinated pitch was heated at 300° C. for 12 hours to provide a clear resin-like pitch. Using 5 g of this fluorinated pitch, 20 g of Fleon 113, 0.1 g of $C_6F_{13}COONa$ and 65 g of water, a fluorinated pitch suspension was prepared. One-hundred (100) grams of the graphite fiber prepared above was dipped in this fluorinated pitch suspension and dried well.

The graphite fiber thus treated was molded as in Example 1 and subjected to the compressive strength test and sliding test.

Comparative Example

A graphite fiber (SG241, DONAC Co., Ltd., mean filament diameter 13 μmϕ, mean filament length 130 μm) was molded as in Example 1 and subjected to the compressive strength test and sliding test.

The results are shown in Table 1.

In Table 1, the surface area is represented in units of $m^2/g$, the compressive strength at 25% deformation is expressed in units of $kg/cm^2$, the wear of the testpiece in units of $\times 10^{-4}$ [$(mm/km)/(kg/cm^2)$] and the wear of the counterpart member in units of $\times 10^{-1}$ (mg/km).

TABLE 1

| | O/C ratio | F/C ratio | Br/C ratio | Surface area | Compressive strength | Wear of test-piece | Wear of counter-part |
|---|---|---|---|---|---|---|---|
| Example 1 | 0.15 | | | 6.5 | 428 | 4.9 | 0.11 |
| Example 2 | 0.10 | | | 0.6 | 411 | 5.5 | 0.11 |
| Example 3 | 0.19 | | | 1.0 | 433 | 5.5 | 0.11 |
| Example 4 | 0.20 | | | 1.1 | 440 | 4.9 | 0.11 |
| Example 5 | 0.12 | | | 0.6 | 409 | 4.9 | 0.11 |
| Example 6 | 0.07 | | 0.05 | 0.6 | 391 | 6.1 | 0.11 |
| Example 7 | 0.03 | 0.8 | | 0.7 | 395 | 3.6 | 0.04 |
| Example 8 | 0.03 | 1.5 | | 1.0 | 390 | 3.6 | 0.07 |
| Example 9 | 0.33 | 1.6 | | 1.0 | 400 | 3.6 | 0.07 |
| Example 10 | 0.14 | 1.2 | | 2.0 | 470 | 2.4 | 0.04 |
| Example 11 | 0.10 | 1.3 | | 1.0 | 455 | 3.0 | 0.07 |
| Comp. Ex. | 0.03 | | | 0.3 | 360 | 9.7 | 0.14 |

What is claimed is:

1. A method of producing a graphite fiber-reinforced fluororesin composite which comprises molding a composition comprising a fluororesin and a graphite fiber with a specific surface area of 0.6 to 25 $m^2/g$ and a surface atomic oxygen/atomic carbon ratio of 0.10 to 0.20 as determined by X-ray photoelectron spectroscopic analysis, wherein said graphite fiber is a fiber obtainable (1) by oxidizing a graphite fiber at a temperature of 60° C. to 120° C. in a liquid phase containing an oxygen-containing compound, or at a temperature of 500° to 1,000° C. in a gas phase containing an oxygen-containing compound, (2) by comminuting a graphite fiber to 10 to 700 μm in length in an oxygen-containing gas atmosphere, (3) by applying an inorganic oxidizing agent to the surface of a graphite fiber and heating the same at a temperature of 300° to 1,000° C., (4) by subjecting a graphite fiber to electrolytic oxidation in an electrolyte solution capable of electrolytic oxidation using said fiber as the positive electrode, where an electric current of not less than 100 coulombs/g is passed through the electrolyte solution and the bath temperature is in the range of 20° C. to 100° C., or (5) by subjecting a graphite fiber to a plasma discharge treatment in the presence of an inert gas at a pressure of 0.001 to 10 Torr by applying an electric power of 10 W to 100 KW at a frequency of 10 kHz to 100 MHz and contacting the fiber with an oxygen-containing gas.

2. A method of producing a graphite fiber-reinforced fluororesin composite according to claim 1 which comprises compression-molding the composition comprising the fluororesin and the graphite fiber and annealing the resultant molding or subjecting said composition to injection or extrusion molding.

3. A method of producing a graphite fiber-reinforced fluororesin composite according to claim 1 wherein the composition comprises 92 to 75 parts by weight of the fluororesin and 8 to 25 parts by weight of the graphite fiber.

4. A method of producing a graphite fiber-reinforced fluororesin composite according to claim 1 wherein said graphite fiber has a specific surface area of 0.8 to 10 $m^2$/g and and a surface atomic oxygen/atomic carbon ratio of 0.12 to 0.20 as determined by X-ray photoelectron spectroscopic analysis.

5. A method of producing a graphite fiber-reinforced fluororesin composite according to claim 1 wherein said fluororesin is polytetrafluoroethylene.

6. A method of producing a graphite fiber-reinforced fluororesin composite according to claim 1 wherein said graphite fiber is a graphite fiber obtainable by subjecting a carbon-fiber or an infusibilized precursor fiber to heat treatment at a temperature not lower than 2,200° C.

7. A method of producing a graphite fiber-reinforced fluororesin composite according to claim 1 wherein said graphite fiber is a graphite fiber obtainable by subjecting a graphite fiber having an X-ray photoelectron spectroscopic surface atomic oxygen/atomic carbon ratio of 0.10 to 0.20 to at least one of the following treatments (6) to (10) to further have an X-ray photoelectron spectroscopic surface atomic halogen/atomic carbon ratio of 0.05 to 1.8

(6) chemical reaction with a halogen or a halogen-containing inorganic compound, (7) a plasma discharge treatment in a halogen-containing gas, (8) polymerizing a halogen-containing monomer, (9) sizing with a halogen-containing compound, or

(10) grafting with a halogen-containing compound.

8. A method of producing a graphite fiber-reinforced fluororesin composite according to claim 7 wherein the halogen-containing component in methods (7) to (10) is a fluorine-containing component.

9. A method of producing a graphite fiber-reinforced fluororesin composite according to claim 1 wherein said graphite fiber is a graphite fiber obtainable by grafting a halogen-containing compound to a graphite fiber with an X-ray photoelectron spectroscopic surface atomic oxygen/atomic carbon ratio of 0.10 to 0.20 to further have an X-ray photoelectron spectroscopic surface atomic halogen/atomic carbon ratio of 0.05 to 1.8.

10. A method of producing a graphite fiber-reinforced fluororesin composite according to claim 9 wherein the halogen-containing compound is a fluorine-containing compound having terminal reactive group capable of reaction with a group produced by the oxidation of said graphite fiber.

11. A method of producing a graphite fiber-reinforced fluororesin composite according to claim 9 wherein the halogen-containing compound is a fluorine-containing compound having an epoxy group, an acyl halide group or a carboxylic group.

12. A method of producing a graphite fiber-reinforced fluororesin composite according to claim 1 wherein said graphite fiber is a graphite fiber obtainable by sizing a graphite fiber having an X-ray photoelectron spectroscopic surface atomic oxygen/atomic carbon ratio of 0.10 to 0.20 with a halogen-containing compound to further have an X-ray photoelectron spectroscopic surface atomic halogen/ atomic carbon ratio of 0.05 to 1.8.

13. A method of producing a graphite fiber-reinforced fluororesin composite according to claim 12 wherein said halogen-containing compound is a fluorine-containing component.

14. A method of producing a graphite fiber-reinforced fluororesin composite according to claim 12 wherein the halogen-containing compound is a fluorinated pitch.

15. A method of producing a graphite fiber-reinforced fluororesin composite according to claim 1 wherein said graphite fiber has a specific surface area of 1 to 6 $m^2$/g and a surface atomic oxygen/atomic carbon ratio of 0.15 to 0.20 as determined by X-ray photoelectron spectroscopic analysis, and said fluororesin is polytetrafluoroethylene.

* * * * *